Aug. 21, 1956   G. HAMMARQUIST   2,759,623
CONTAINER FOR MOTOR VEHICLE REGISTRATION CARDS
Filed June 4, 1954
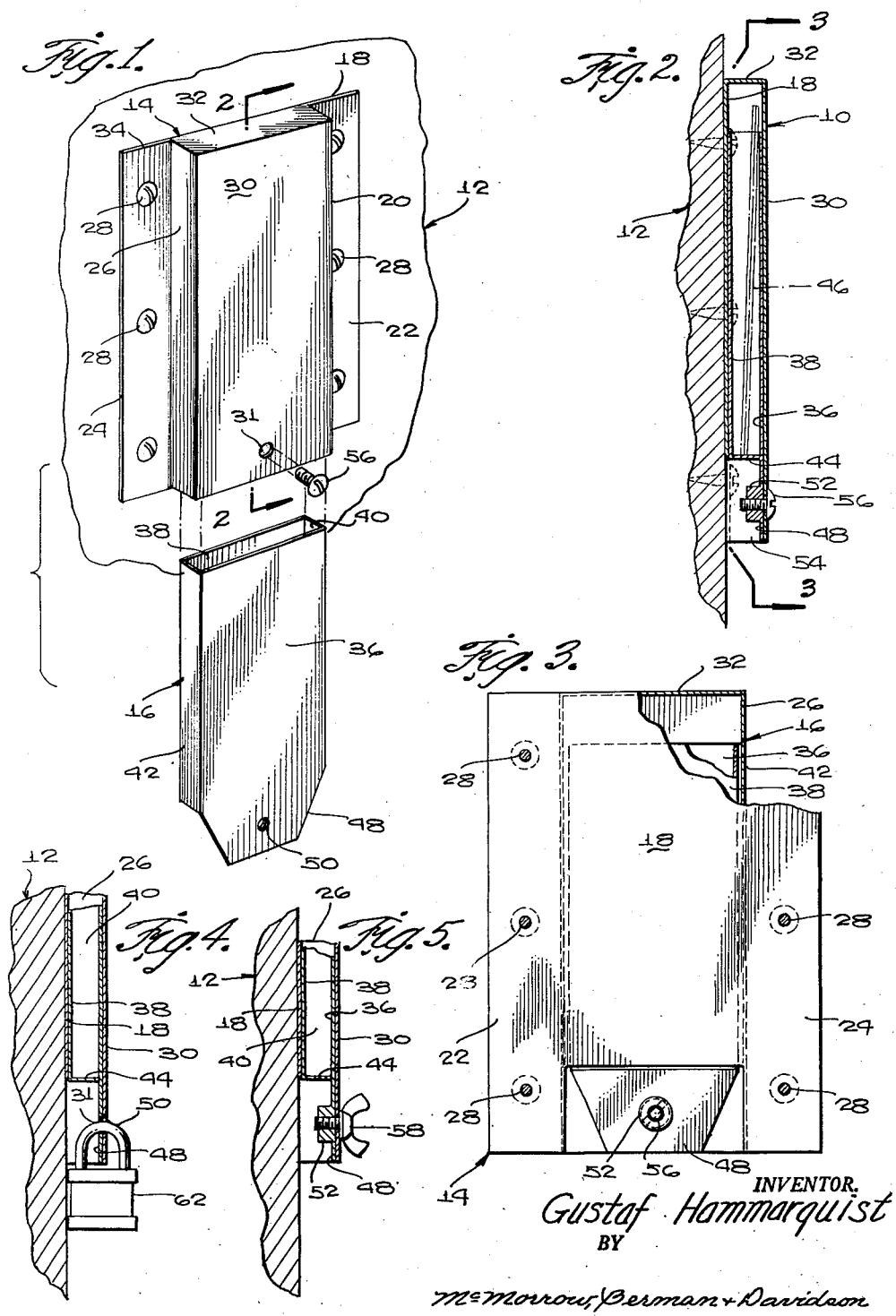
INVENTOR.
Gustaf Hammarquist
BY
McMorrow, Berman & Davidson
ATTORNEYS

United States Patent Office 2,759,623
Patented Aug. 21, 1956

2,759,623

CONTAINER FOR MOTOR VEHICLE REGISTRATION CARDS

Gustaf Hammarquist, New Bedford, Mass.

Application June 4, 1954, Serial No. 434,407

2 Claims. (Cl. 220—18)

This invention relates generally to record containers and more particularly to containers storing record cards pertaining to automotive vehicles.

It is an object of this invention to provide a container for registration cards, bills of lading, or any paper for automotive vehicles or vehicles such as freight trailers which are customarily drawn by prime movers such as tractors, the container being of waterproof construction and adapted to be secured to such automotive vehicles or to the freight trailer.

It is a further object of this invention to provide a motor vehicle registration card container wherein the card will be safely stored, and yet readily available to the operator of the motor vehicle in order to show ownership of the vehicle when that issue arises.

Yet another object of this invention is to provide a motor vehicle registration card holder which may be locked against theft of the card, since in most State jurisdictions it is required that the vehicle registration card be present with the vehicle at all times, so that ownership may be readily proven, and hence it is desirable to keep the card permanently with the motor vehicle, for the duration of the life of the card, and yet not have it subject to easy unlawful appropriation by unauthorized persons.

Another and still further object of this invention is to provide a motor vehicle registration card container which may be readily fabricated from easily procurable materials of relatively low cost, and which may be produced economically.

Other objects and advantages will become apparent from a consideration of the following detailed description, forming the specification, and taken in conjunction with the accompanying drawing, in which:

Figure 1 is an exploded perspective view of the registration card container embodying this invention;

Figure 2 is a vertical cross sectional view through the container of Figure 1, with the inner case inserted in position of use, taken along the line 2—2 of Figure 1;

Figure 3 is a rear elevational view, partially broken away, taken along the line 3—3 of Figure 2;

Figure 4 is a fragmentary cross sectional view similar to Figure 2, but showing a modified form of securing means between the inner and outer cases; and Figure 5 is a cross sectional view similar to Figure 4, but showing a still further modified form of securing the inner and outer cases together.

With continued reference to the drawings, there is shown a container, generally indicated at 10, and adapted to be mounted upon a portion of a motor vehicle, indicated generally at 12. The container 10 may be mounted interiorly or exteriorly of the motor vehicle, since it is of a waterproof construction, as will presently appear.

The container 10 comprises an outer casing, generally indicated at 14 and an inner casing generally indicated at 16.

The outer casing 14 includes a back plate 18 of generally rectangular form and made of suitable sheet material, and having a pocket 20 which extends longitudinally of the back plate centrally thereof so as to define flanges 22 and 24 extending outwardly from opposite sides of the spaced, parallel side walls 26 of the pocket. The container 10 is adapted to be attached to the selected portion 12 of the motor vehicle by a plurality of spaced securing elements, such as screws 28 passing through the flanges 22 and 24 and into the selected portion of the motor vehicle.

The pocket 20 has a front wall 30 extending between the side walls 26 at the ends of the side walls remote from the back plate 18 so that the front wall is in spaced, parallel relation to the back plate and extends a full length of the back plate. A top wall 32 closes the one end of the pocket 20 by extending perpendicularly from the edge 34 of the back plate and between the side walls 26 of the pocket and outwardly to join with the top edge of the front wall 30. The other end of the pocket, remote from the wall 32, is open so that the inner casing 16 may be received within the pocket 20.

The inner casing 16 comprises spaced, parallel front and rear walls 36 and 38 joined together along their opposite longitudinal edges by spaced parallel side walls 40 and 42 which extend perpendicularly thereto. An end wall 44 encloses one end of the inner casing 16 by extending across the terminal edges of the side walls 40 and 42 and between the terminal edge of the rear wall 38 to the front wall 36. Thus, the inner casing 16 has at one end thereof remote from the end wall 44, open to receive therein a motor vehicle registration card, as indicated in broken lines in Figure 2, and identified by the reference numeral 46, or other pertinent motor vehicle records.

A tongue 48 extends longitudinally from the end of the front wall 36 remote from the open end of the casing 16 as an extension thereof, and is provided with an opening 50 transversely therethrough and approximately centrally disposed therein. In the case of the forms of the invention shown in Figures 2 and 5, the tongue 48 has formed thereon a boss 52 which extends inwardly thereof from the rear face of the tongue and is provided with a central internally threaded opening adapted to register with the opening 50 when the inner casing 16 is inserted through the open end 54 of the outer casing 14.

In the form shown in Figure 2, the inner and outer casings are secured together by a suitable threaded fastening means such as screw 56 while in the case of the form of Figure 5, the securing means is in the form of a wing-headed bolt or screw 58.

It will be noted that the inner casing 16 is generally of rectangular cross sectional shape and of such dimension as to have an easy sliding fit within the outer casing 14, and the inner casing 16 may be made of a suitable sheet material, such as sheet metal or a suitable plastic material.

Also, it will be appreciated that the inner casing 16 is adapted to hold the registration card or other pertinent motor vehicle record papers and be inserted into the outer casing 14 by entering the open end 54 of the pocket 20, and secured within the pocket by suitable securing means such as the screw 56 or the wing bolt 58.

In the form of the invention shown in Figure 4, all of hereinbefore described structure is repeated except that the boss 52 projecting from the rear face of the tongue 48 has been eliminated, thus, the opening 31 through the front wall 30 of the pocket 20 adjacent the open end 54 thereof, which registers with the opening 50 and the tongue 48 to receive the screw 56 therethrough and through the registering opening 50 in the case of the structure in Figure 2 and the wing bolt 58 in the case of the structure in Figure 5, will receive the shackle or bow 60 of a padlock 62 so that the inner and outer casings may be lockingly secured together by means of the padlock, which is key operated for release and removal from its locking engagement through the registering openings 31 and 50.

From the foregoing, it will be apparent that there has been provided a container for cards which comprises an outer casing 14 and an inner casing 16 slidably received within the outer casing, a pocket 20 open at one end carried by said outer casing and having an opening 31 therethrough adjacent the open end, the inner casing 16 having an open end and a tongue 48 extending longitudinally therefrom at the end thereof remote from the open end, the tongue 48 having an opening 50 therethrough adapted to register with the opening 31, and the fastener means in the form of a screw 56, a wing bolt 58 or the shackle 60 of the padlock 62 to secure the inner and outer casings together.

Also, the outer casing 14 includes a back plate 18 which extends to opposite sides of the pocket 20 to define flanges 22 and 24 adapted to be secured to a supporting surface such as a selected portion of a motor vehicle. The pocket includes spaced end walls or side walls 26 and a front wall 30 extending therebetween in spaced relation to the back plate 18, and a top wall 32 closing the end of the pocket remote from the open end 54 thereof.

While there is shown and described the preferred embodiment of the invention, it is to be understood that the structure is susceptible to change and modification within the practicability of the invention and therefore should be limited only the scope of the claims appended hereto.

What is claimed is:

1. A container for cards comprising an outer casing including a flat back plate, a pair of spaced side walls carried by said back plate projecting perpendicularly therefrom at locations spaced inwardly from opposite side edges of the back plate, a front wall extending between said side walls parallel to said back plate, and an end wall closing one end of the side and front walls to define along with the front and side walls a pocket open at one end; an inner casing including parallel front and back walls, parallel side walls extending between said front and back walls, and an end wall closing one end of the inner casing; said inner casing conformably shaped to be slidably received within said pocket through the open end thereof with said front walls of the inner casing and pocket arranged in face to face relation with the end wall of said inner casing spaced inwardly from the open end of said pocket, a tongue carried by and extending longitudinally from the front wall of said inner casing at said one end thereof and underlying the front wall of said pocket, and fastener means releasably securing the tongue and the front wall of the pocket together for maintaining said inner casing within said pocket.

2. A container for cards comprising an outer casing including a flat back plate, a pair of spaced side walls carried by said back plate projecting perpendicularly therefrom at locations spaced inwardly from opposite side edges of the back plate, a front wall extending between said side walls parallel to said back plate, and an end wall closing one end of the side and front walls to define along with the front and side walls a pocket open at one end; an inner casing including parallel front and back walls, parallel side walls extending between said front and back walls, and an end wall closing one end of the inner casing; said inner casing conformably shaped to be slidably received within said pocket through the open end thereof with said front walls of the inner casing and pocket arranged in face to face relation and the end wall of said inner casing spaced inwardly from the open end of said pocket, a tongue carried by and extending longitudinally from the front wall of said inner casing at said one end thereof and underlying the front wall of said pocket, said tongue having an opening transversely therethrough, said outer casing front wall having an opening transversely therethrough in register with said first mentioned opening, and a fastener means passing through said registering openings to secure said inner casing and pocket together.

References Cited in the file of this patent

UNITED STATES PATENTS

| | | |
|---|---|---|
| 1,392,661 | Seese | Oct. 4, 1921 |
| 1,980,944 | Rowe | Nov. 19, 1934 |